(12) United States Patent
Ramberg

(10) Patent No.: US 8,837,665 B2
(45) Date of Patent: Sep. 16, 2014

(54) EX-VESSEL ACCIDENT MITIGATION

(76) Inventor: Charles E. Ramberg, Los Altos Hills, CA (US)

( * ) Notice: Subject to any disclaimer, the term of this patent is extended or adjusted under 35 U.S.C. 154(b) by 1269 days.

(21) Appl. No.: 12/670,963

(22) PCT Filed: Jul. 19, 2008

(86) PCT No.: PCT/US2008/070573
§ 371 (c)(1),
(2), (4) Date: Jan. 27, 2010

(87) PCT Pub. No.: WO2009/055106
PCT Pub. Date: Apr. 30, 2009

(65) Prior Publication Data
US 2010/0183111 A1    Jul. 22, 2010

Related U.S. Application Data

(60) Provisional application No. 60/963,098, filed on Aug. 3, 2007.

(51) Int. Cl.
| | |
|---|---|
| *G21C 15/18* | (2006.01) |
| *G21C 9/00* | (2006.01) |
| *G21C 13/02* | (2006.01) |
| *G21C 9/016* | (2006.01) |
| *G21C 9/004* | (2006.01) |
| G21C 15/00 | (2006.01) |
| G21C 13/00 | (2006.01) |

(52) U.S. Cl.
CPC ............... *G21C 9/016* (2013.01); *G12C 13/08* (2013.01); *G21C 9/004* (2013.01); *Y02E 30/40* (2013.01)
USPC ........... 376/282; 376/277; 376/287; 376/293; 376/294

(58) Field of Classification Search
USPC ......... 376/277, 280, 282, 283, 284, 287, 289, 376/290, 293, 294
See application file for complete search history.

(56) References Cited

U.S. PATENT DOCUMENTS

| | | | | | |
|---|---|---|---|---|---|
| 3,379,613 | A | * | 4/1968 | Tagami et al. | 376/282 |
| 3,423,286 | A | * | 1/1969 | Hinds et al. | 376/293 |
| 3,494,828 | A | * | 2/1970 | Chave | 376/283 |
| 3,580,806 | A | * | 5/1971 | Weems et al. | 376/284 |
| 3,718,539 | A | * | 2/1973 | West et al. | 376/283 |
| 3,847,735 | A | * | 11/1974 | Schluderberg | 376/283 |
| 3,879,958 | A | * | 4/1975 | Field | 376/284 |
| 3,899,391 | A | * | 8/1975 | Sulzer et al. | 376/283 |
| 3,900,366 | A | * | 8/1975 | Sakaguchi | 376/282 |
| 3,929,567 | A | * | 12/1975 | Schabert et al. | 376/282 |

(Continued)

OTHER PUBLICATIONS

Definition of the word "design" in "Webster's Third New International Dictionary, Unabridged," Meriam-Webster, Incorporated, Springfield, Massachusetts, USA; 1993; as found on the Internet at lionreference.chadwyck.com.*

*Primary Examiner* — Bernarr Gregory
(74) *Attorney, Agent, or Firm* — Bresbo AB

(57) ABSTRACT

Heat from an ex-vessel mass of core material is removed to cooler regions of a containment envelope via liquid and/or vapor phase transport. Various aspects provide for contacting the ex-vessel core material with a material having properties including melting point, boiling point, and condensation kinetics such that condensation of the material in cooler regions of the containment envelope is at least as fast as evaporation of the material due to heat absorption from the core material and associated species.

20 Claims, 1 Drawing Sheet

(56) References Cited

U.S. PATENT DOCUMENTS

| | | | | |
|---|---|---|---|---|
| 4,238,289 A | * | 12/1980 | Weems et al. | 376/284 |
| 4,305,896 A | * | 12/1981 | Tominaga et al. | 376/283 |
| 5,011,652 A | * | 4/1991 | Tominaga et al. | 376/283 |
| 5,345,481 A | * | 9/1994 | Oosterkamp | 376/293 |
| 7,680,237 B1 | * | 3/2010 | Meseth | 376/277 |

* cited by examiner

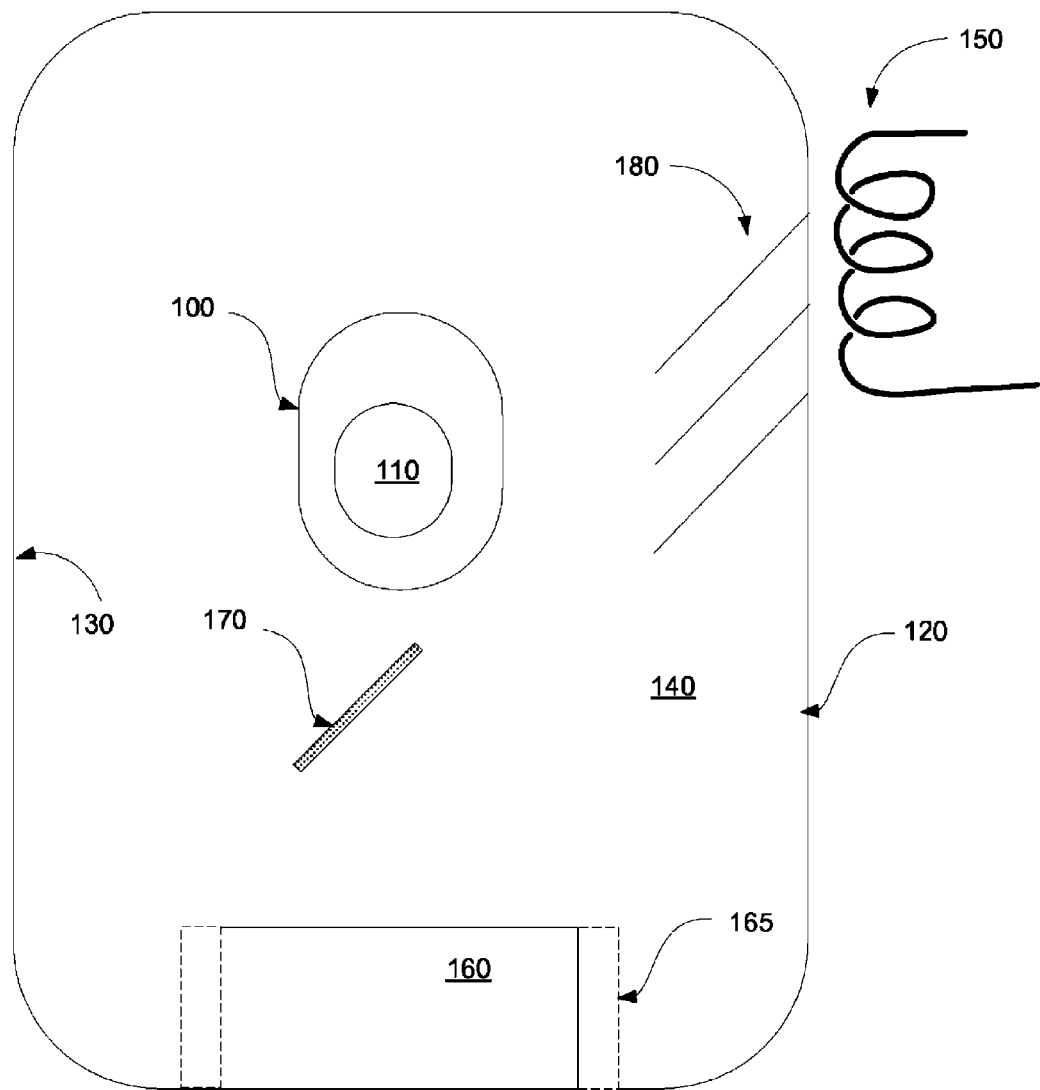

EX-VESSEL ACCIDENT MITIGATION

CROSS REFERENCE TO RELATED APPLICATIONS

This description is the National Stage and claims the priority benefit of international patent application No. PCT/US08/70573, filed Jul. 19, 2008 and entitled "Ex-Vessel Accident Mitigation," which claims the priority benefit of U.S. Provisional Patent Application Ser. No. 60/963,098, filed Aug. 3, 2007, the disclosures of which are incorporated herein by reference.

BACKGROUND

1. Technical Field

The present invention relates to heat transfer on a large scale, and more particularly to materials that improve heat transfer rates.

2. Description of Related Art

Nuclear reactors generally include a vessel in which a nuclear reaction takes place. The vessel generally includes a vessel envelope that encloses a core of nuclear material, control rods, working fluid and the like. Often, the vessel is housed in a large building, described herein as a containment envelope. The containment envelope is generally much larger than the vessel, and is generally sealed or sealable to the outside world up to a maximum pressure, and filled with a gas such as air.

Notwithstanding safety measures, uncontrolled nuclear reactions may result in the generation of heat within the vessel beyond the ability of the heat transfer apparatus to remove the heat. In such cases, the core may fail, and temperatures within the vessel may rise to temperatures above 500, 1000, 1500, 2000, 2500, or even 3000 degrees Celsius.

In some cases, the vessel and associated apparatus may transfer sufficient heat from a failed core that the vessel envelope remains substantially intact. In other cases, the failed core material may breach the vessel and enter the containment environment. Vessel envelopes may be designed to resist temperatures up to 600, 800, 1000, 1200 or even 1400 degrees Celsius, but core materials may reach temperatures over 2400 degrees Celsius.

The mass of various core materials and vessel materials may be very large (e.g., hundreds or even thousands of tons). As such, the trajectory of the ex-vessel core material, (often described as "corium") from the vessel to a surface of the containment is largely influenced by gravity (e.g., the corium may fall to a "floor" of the containment envelope). Contact between the corium and containment envelope typically degrades the containment envelope and associated components, often due to the high temperature of the corium.

The removal of heat from the corium should occur at a faster rate than the generation of heat by the corium. The removal of heat from the corium should also be faster than a degradation of the containment envelope in order to prevent or delay a breach of the containment envelope.

Cooling liquids (e.g., water) may contact the corium and remove heat from the corium via evaporation of the liquid. However, evaporation generally increases the total gas pressure inside the containment, and so evaporated liquids (e.g., steam) may generate significant hydrostatic pressure in the containment (e.g., greater than 3, 7, 10, 15, 20, 30, 40, 50, or even 100 atmospheres) which may exceed the maximum pressure that the containment envelope can contain. Increasing the size of the containment envelope may increase the rate of condensation (in that the total mass of condensing fluid generally increases with increasing surface area upon which it is condensing), but increasing the size of the containment envelope too much may cause other problems, such as reduced resistance to internal pressure. For a given containment envelope inner surface area, increasing a condensation rate of a vapor phase (on the inner surface) that has (in evaporating) removed heat from the core material may be desirable.

To reduce pressure within the containment envelope, heat absorbed by evaporation may be transferred (e.g., to the outside world) before the pressure inside the containment envelope rises above a critical pressure associated with failure of the containment envelope.

Condensation of a gas or vapor may transfer heat from the vapor to a surface. However, many materials that are liquids at room temperature may have condensation rates on an inner surface of the containment envelope that are slower than their associated evaporation rates at the corium. For example, water may condense at approximately 100 degrees, and an inner surface temperature may be 30 degrees, but ex-vessel material (evaporating the water) may be 2900 degrees. A condensation rate may be mismatched with an evaporation rate when the boiling point (or the condensation temperature) is relatively close to the temperature of the inner surface and much lower (e.g., 500, 1000, 1500, 2000, or even 2500 degrees lower) than the first temperature and/or temperature of the ex-vessel core material.

When a gaseous boundary layer is formed between hot, ex-vessel core material at a first temperature and a liquid having a boiling point far below the first temperature (e.g., water cooling of 2400 degree core material), heat transfer to the liquid may be relatively reduced by a gaseous boundary layer. In such cases, heat transfer from the core material may not necessarily "benefit" from water's boiling point being hundreds, or even thousands of degrees below the core material temperature. As such, using a cooling liquid with a higher boiling point may result in rates of heat transfer from the core material to the liquid that are at least as fast as heat transfer to water.

Thus, the removal of heat from an ex-vessel mass of core material, in a manner that does not lead to containment overpressure and/or failure may reduce the risk of containment breach.

SUMMARY OF THE INVENTION

Methods and apparatus may increase the safety of nuclear reactors, particularly in an ex-vessel nuclear accident. Certain aspects provide for liquid and/or vapor phase heat transfer away from hot core material (or other heat sources) by using substances having heat transfer rates to a containment envelope that are large enough to prevent overpressure, thermal, and/or chemical degradation of the containment. Certain aspects provide for heat transfer materials having a melting point between an expected ex-vessel core material temperature and an expected inner surface temperature. These materials may be chosen such that a mass transfer rate associated with condensation of the material in cooler regions of the containment envelope is at least as fast as mass transfer rates associated with evaporation of the material in the region associated with the hot core material.

Various aspects provide for an inner surface of a substantially sealed containment envelope and systems and methods to transfer heat from ex-vessel core material to a region outside the containment envelope without degradation and/or overpressurization of the containment envelope. In certain aspects, a first material disposed in a position to absorb heat from ex-vessel core material has a melting point below a first temperature associated with an estimated temperature of the ex-vessel core material or a failure temperature of the vessel or another temperature. Generally, the first material may have a boiling point below a second temperature associated with a temperature of an inner surface of the containment envelope, and the first material may be characterized by thermodynamic and kinetic properties such that heat is transferred from the first material to the containment envelope at a fast enough rate (e.g., via condensation) that a vapor phase associated with the first material does not (or is not expected to) become greater than a critical pressure associated with a pressure limit of the containment envelope.

In some aspects, the first material may have a boiling point above 100 degrees Celsius at 1 atmosphere of pressure. In other aspects, the first temperature may be above 500 degrees Celsius, and in some cases, the boiling point of the first material is below the first temperature. In certain aspects, the first material may have a melting point between 50 and 800 degrees Celsius. In certain aspects, the first material may have a boiling point at 1 atmosphere between 150 and 2800 degrees Celsius, and in some cases, the first material may have a boiling point between 800 and 2700 degrees Celsius, or even between 900 and 1900 degrees Celsius. In some aspects, the first material may have a melting point between 200 and 700 degrees Celsius, and a boiling point between 800 and 2650 degrees Celsius. In some aspects, the first material may have a melting point greater than a second temperature associated with the inner surface.

In some aspects, the first material comprises a composition that is not expected to react exothermically with any component comprising more than 1% of the breached core material, the vessel envelope material, associated materials or any combination thereof. In certain aspects, an inner surface is expected to reach a third temperature, between the first and second temperatures. Generally, the third temperature may be within 400 degrees of the second temperature, and may be associated with a heating of the inner surface during an accident. In certain aspects, the first material has a boiling point above the third temperature, and in some cases, the first material has a melting point below the third temperature.

The first material may comprise one or more materials, and in some cases, one or more materials may be characterized by a difference between their respective melting and boiling points of at least 100 degrees Celsius at atmospheric pressure. In some embodiments, the difference between melting and boiling points may be as great as 2700 degrees Celsius.

In certain aspects, a liquid phase associated with the first material has a viscosity below 1000 cp, below 100 cp, or even below 10 cp. In some cases, a liquid phase first material may spread out into a shallow "puddle" which increases the surface area of the first material with respect to its volume.

The density of a solid and/or liquid phase of the first material may be greater than a density associated with one or more components of the core material, vessel material, and/or associated material. Various apparatus may include a system to substantially contain a liquid phase of first material 160, and these apparatus may generally be operable to temperatures above 800, 1100, or even 1400 degrees Celsius. In certain cases, these apparatus may substantially contain a liquid first material and substantial quantities of ex-vessel core material associated with the first material. In certain cases, the liquid phase of the first material is denser than various core materials, and various apparatus contain the liquid first material and associated core materials with a sufficient depth and volume that the core materials are buoyantly "floated" above a floor of the containment. In some cases, floating may be enhanced via various boundary layers associated with vaporization of the first material.

In select embodiments, a first material may comprise any of or a combination of Pb, Zn, Sn, S, Bi, and Al, often as uncombined species. In a preferred embodiment, a first material may be substantially comprised of metallic Pb. In other embodiments, a first material comprises S, which may also provide for desired chemical reactions with the core material.

Select embodiments feature various apparatus such as fins, rods, mesh, tubes, channels and other devices, associated with the containment envelope, generally configured to increase a condensation rate of the first material in cooler regions of the containment. Generally, an inner surface area of a containment envelope may be maximized as necessary to increase condensation rates thereon.

Substantial amounts of the inner surface of the containment may be in fluid communication with a region associated with the first material, particularly when the first material is removing heat from ex-vessel core material. In some cases, substantial amounts of the inner surface are in "line of sight" fluid communication with the interacting first material.

Select aspects feature various heat transfer apparatus associated with the containment envelope, often located "outside" of the inner surface, and typically configured to transfer heat from inside the containment envelope to the outside world without transferring matter from inside the containment envelope to the outside world. In some embodiments, these apparatus feature tubes, fins, and/or other apparatus substantially inside the containment envelope, often incorporating a fluid to transfer heat outside of the containment envelope.

Various aspects include a design for any of the apparatus described herein, a method comprising the use of any of the apparatus described herein, and a method comprising the fabrication of any of the apparatus described herein. Certain embodiments feature a method for increasing the public's tolerance of nuclear power comprising the describing of any of the apparatus described herein and a way in which these apparatus may improve safety. Some embodiments may not require the choice or determination of a first or second temperature. Any claimed limitation may be combined with one or more other claimed limitations. Various embodiments may be used to cool reactor vessels, even when the vessel has not been breached. Although various embodiments are described in the context of nuclear reactors, they may also be used to transfer heat from other hot materials to cooler regions of a containment containing the hot materials.

BRIEF DESCRIPTION OF THE DRAWINGS

FIG. 1 is a schematic of a reactor vessel in a containment envelope, incorporating various embodiments.

DETAILED DESCRIPTION OF THE INVENTION

Generally, a nuclear reactor may include a building or other structure (herein, a containment envelope) within which a reactor vessel is located. Typically, the containment envelope is sealed or may be sealed to the outside environment such that the substances within the containment envelope cannot escape to the outside environment. The reactor vessel typically houses fissile material (e.g., uranium, oxides of uranium, and/or other materials comprising actinoids), various packaging materials (e.g., zircaloy), control rods, and a working fluid.

FIG. 1 is a schematic of a reactor vessel in a containment envelope, incorporating various embodiments. Vessel 100 contains core material 110, and may be located within containment envelope 120. Containment envelope 120 includes an inner surface 130, which may have an inner surface area much larger (e.g., 3 times, 10 times, 100 times, 1000 times, 10,000 times, or even 100,000 times) larger than an outer surface area of vessel 100 (i.e., containment envelope 120 may be much larger than vessel 100). Containment envelope 120 may generally seal the environment within from the outside world. Containment envelope 120 may be characterized by a pressure limit describing a maximum pressure of a gas phase 140 within, beyond which containment envelope 120 may fail (e.g., allow passage of material from within to the outside world). Generally, the pressure of gas phase 140 may result from the vapor pressures of all gaseous phases within the containment envelope. Typical pressure limits may be of the order of a few atmospheres (e.g., 2-8), a few tens of atmospheres, or in some instances a few hundreds of atmospheres.

In various implementations, a first material 160 may be disposed within containment envelope 120, such that upon a breach of vessel 100 by core material 110, the breached core material comes into contact with first material 160. The mass of first material 160 may be of the same order as, or even larger than, the mass of the core material 110. In some embodiments, first material 160 may have a mass of several tons, several tens of tons, over 100 tons, over 1000 tons, or even over 10,000 tons. First material 160 may be have a shape designed to maximize the contact area between first material 160 and the ex-vessel core material.

In some aspects, first material 160 is located substantially beneath vessel 100. In other aspects, various structural components 170 may be included within the containment that guide the breached (i.e., ex-vessel) core material (which may include vessel material and/or other materials) to first material 160. Structural components 170 may comprise steels, Ni and/or Co-based alloys, ceramics, carbides and the like, and may include materials to control heat transfer, chemistry or other factors in addition to structural properties. Structural components 170 may also increase the surface area to volume ratio of the breached core material.

First material 160 may comprise a solid and/or a liquid. Solid forms of a first material 160 may be disposed without associated structures to "retain" them, and in such cases first material 160 may subsequently melt during an accident and substantially spread out after having melted. Solid or liquid first material 160 may also be disposed within a system to contain a liquid phase of first material 160, annotated as pool 165 on FIG. 1. Pool 165 may substantially contain the liquid phase and/or associated core materials disposed within. Pool 165 may be located as desired, for example at, above, or below a "floor level" of containment envelope 120. Pool 165 may also include a top surface that provides for support (e.g., walking on) of first material 160 during normal use, and in some cases this top surface may yield to descending corium during an accident, allowing contact between the corium and first material 160.

In some aspects, heat transfer apparatus 150 associated with containment envelope 120 may operate to remove heat from containment envelope 120, typically without an associated mass transfer between the interior of containment envelope 120 and the outside environment. Heat transfer apparatus 150 may include fluids, cooling tubes, pipes, fins, heat pipes and/or other heat transfer systems.

Certain aspects may optionally include apparatus to enhance the interaction between containment envelope 120 and gas phase 140, such as wires, tubes, fins, mesh and the like. For example, fins 180 may generally have high surface area, and may have high thermal conductivity and/or be configured to conduct heat from the gas phase 140 to containment envelope 120. Inner surface 130 and/or fins 180 may also include a surface coating designed to increase the adsorption of a vapor phase associated first material 160, to react with first material 160, and/or improve the emissivity associated with this surface. Generally, descriptions of interactions with inner surface 130 may include interactions with fins 180 and the like.

A choice of first material 160 may optionally include knowledge or an estimate of a first temperature, typically associated with a temperature from which first material 160 may be transferring heat. A first temperature may be associated with a failure of vessel 100 or an associated material. Vessel 100 may be characterized by a first temperature, which may be associated with an estimated, calculated, or known transition from "in-vessel" failure to "ex-vessel" failure (i.e., breach of the vessel by the core material). Typically, the first temperature may be associated with a thermal, mechanical and/or chemical breakdown of the vessel envelope containing the overheated core material (which is at or above the first temperature). The first temperature may be chosen arbitrarily, although the choice of a first temperature (and matching first material) should generally correspond to the predicted temperature of the material that will ultimately be cooled by first material 160.

A first temperature may be estimated for most solids (which would be used to construct vessel 100) and associating the first temperature with a failure temperature of the vessel may be a convenient way to estimate a lower limit of the first temperature. For some vessel envelope materials, the first temperature may be a melting point of the solid from which the vessel is constructed. For other materials, the first temperature may be the temperature at which the yield stress decreases below a critical threshold. For some vessel materials, the first temperature may be associated with a threshold creep rate or a rate at which a chemical reaction reaches a critical speed. The first temperature may also be estimated using melting points associated with molten core materials, or may be an expected temperature of the ex-vessel core material.

In certain aspects, a first temperature may be between approximately 500 and 3000 degrees Celsius, and for some aspects, the first temperature may be between 700 and 2000 degrees Celsius. In that the first temperature may generally be associated with failure of the vessel, improved reactor vessels may likely result in increasingly higher first temperatures.

The first temperature may also be associated with the temperature of the core material that breaches the vessel, and so could be over 1500, 2000, 2500, 3000, or even 3500 degrees Celsius. In certain aspects, a first temperature is between 2200 and 3200 degrees Celsius. In some aspects, the first temperature may be associated with a driving force for transferring heat from breached core material to first material 160, generally correlated with a difference between the first temperature and the temperature of first material 160, which under typical circumstances may be close to ambient temperature (e.g., 25 degrees Celsius).

First material 160 may remove heat from a concentrated source (e.g., the ex-vessel core material) to a diffuse (i.e., large area) inner surface, and so a first material 160 may be chosen that optimizes a "serial" process of heat and/or mass transfer from the core material to first material 160 to the containment envelope, subject to a pressure limit constraint within the containment envelope. This process may include a first step of absorbing heat (e.g., from the breached core material), a second step of transporting the heat away from the heat source, and a third step of releasing heat (e.g., to the containment envelope). First material 160 may be chosen such that its thermodynamic and kinetic properties maximize heat transfer from the ex-vessel core material to first material 160, spread the heat from the core material to a much larger inner surface area of the containment envelope, and transfer the heat to the containment envelope fast enough that the containment envelope does not overpressurize, preferably while not damaging the containment envelope. Such properties may include without limitation: melting point, boiling point, mass, atomic number, gas phase transport kinetics, adsorption kinetics, interactions with surface chemistries and the like.

In some aspects, first material 160 may be chosen according to a first temperature and a second temperature, which may be associated with an actual or expected temperature of inner surface 130. The second temperature may also be associated with the "receipt" of heat, from the core material, via first material 160.

Inner surface 130 may be characterized by a second temperature, lower than the first temperature, generally below 100 degrees Celsius (particularly before an accident) and often near ambient temperature during normal operation. Inner surface 130 may be cooled (including water cooled or even N2 cooled).

First material 160 may generally have a melting point below the first temperature and a boiling point above the second temperature. First material 160 may be a solid or a liquid near room temperature and/or the inner surface temperature. First material 160 may be characterized by a melting point of the solid phase, a boiling point of the liquid phase, and various characteristics describing the solid, liquid or gaseous phases (e.g., viscosity of the liquid, vapor pressure vs. temperature of the vapor phase).

Generally, first material 160 may absorb heat (e.g., from the breached core material), via heat capacity and one or more phase transitions. In a preferred embodiment, first material 160 may absorb heat via heating of a solid phase, melting of the solid phase, heating of the liquid phase, and evaporation of the liquid phase. In some cases, first material 160 may be chosen such that a combination of enthalpy of melting, integrated enthalpy of heating to vaporization, and enthalpy of vaporization is maximized between the second and first temperatures.

For a solid first material 160 at ambient or operational temperatures, first material 160 may absorb heat by melting. Liquid phase first material 160 may flow, spread, and otherwise convectively transfer heat away from the contacting core material. In certain aspects, spreading of this liquid phase may be used to increase heat transfer to the containment envelope, and in some cases, may increase heat transfer associated with evaporation of this phase. Spreading may also create a wide, shallow "puddle" of liquid first material 160. In some cases, a puddle may be characterized by a depth that is substantially (e.g., 10 times, 100 times, or even 1000 times) smaller than its length and/or width. In some aspects, a puddle may have a higher surface area to volume ratio than the ex-vessel core material being cooled. The region of first material 160 contacting the core material may also be designed to have a depth that provides for a large contact area between the core material and first material 160, and a region far from the core material may be designed to have a shallow depth that increases heat transfer to the containment envelope (e.g., a pool with a deep center and shallow edges).

For some combinations of a first temperature and boiling point of first material 160 (e.g., with a breached core material at a temperature above the boiling point of first material 160), first material 160 may also absorb enough heat to change to a vapor phase, and in such cases, vapor transport of the vapor phase may remove heat from the core material. It may be advantageous to choose a first material 160 with a high boiling point. However, the boiling point should generally not be so high that the containment envelope beneath or otherwise contacting the boiling liquid first material 160 is significantly degraded by the hot liquid phase. In some aspects, condensation of first material 160 on inner surface 130 is maximized, and at least as fast as first material 160 evaporates, subject to the constraints of the vapor pressure remaining below the pressure limit and the boiling point being below a temperature associated with degradation of the portion of the containment envelope contacting the liquid first material 160.

In certain embodiments, first material 160 is chosen to have a high vapor pressure at the first temperature (subject to heat transfer kinetics from the core material to the liquid phase) to maximize vapor phase transport of mass (and thus heat) from the breached core material, and to maximize condensation on the inner surface 130. The total area of inner surface 130 available for concentration may also be adjusted in this optimization.

In certain aspects, the boiling point of first material 160 may be above 800, 1500, 2000, or even 2500 C. In some cases, the melting point of first material 160 may be between 50 and 600 degrees Celsius. In a preferred embodiment, the melting point of first material 160 is between 200 and 600 degrees Celsius. In some embodiments, the boiling point of first material 160 is between 400 and 2700 degrees Celsius. In certain cases, it may be preferable that first material 160 is solid at ambient temperatures (e.g., has a melting point above 25 degrees Celsius).

In a preferred embodiment, the design and/or layout of various components maximizes the vapor phase transport from first material 160 to inner surface 130 and heat transfer to inner surface 130 therefrom. Such designs may include maximizing the area of inner surface 130, and optionally maximizing those areas with "line of sight" exposure to first material 160 when first material 160 is evaporating. For some possible accident conditions (e.g., hundreds of tons or more of core material at 2500 degrees Celsius or higher temperatures), apparatus including first material 160 and inner surface 130 may operate as a very large "heat pipe," transferring heat from the breached core material (contacting the first material) to the inner surface 130, via vapor phase transport of first material 160.

Pressure of gas phase 140 within containment envelope 120 may generally increase as increasing amounts of first material 160 evaporate. Pressure may be reduced by condensing first material 160 on inner surface 130, and so this condensation rate may be maximized in preferred implementations. In select embodiments, first material 160 may have a boiling point significantly above the second temperature and/or temperature of inner surface 130 (before and/or during an accident). In some aspects, the boiling point of first material 160 may be above 150, 400, 800, 1200, 1600, 2000, or even 2400 degrees Celsius. In certain aspects, the difference between a melting point and a boiling point of first material 160 may be more than 100, 500, 1400, or even 2300 degrees Celsius. In some aspects, the first temperature may be above 700 degrees Celsius and the second temperature may be below 110 degrees Celsius. In certain aspects, first material 160 has a melting point above 50 degrees Celsius and a boiling point above 600 degrees Celsius.

In some aspects, first material 160 may have a boiling point above 110 degrees Celsius at the pressure limit, and in some cases, the boiling point may be above 500, 800, 1100, 1700, 2200, or even 2700 degrees. However, in that the driving force for evaporation may be generally associated with the difference between the first temperature and the boiling point, first material 160 may generally be chosen (in evaporative embodiments) to have a boiling point substantially below the first temperature. In some cases, it may be advantageous to use a first material 160 having a boiling point below 3200, 2650, 2250, 1850, or even 1650 degrees Celsius.

In certain embodiments, a rate of mass transfer associated with the condensation of gaseous first material 160 onto inner surface 130 is at least as high as a rate of vapor phase mass transfer from the core material to inner surface 130, which is at least as high as the mass transfer associated with the evaporation of first material 160. In a preferred embodiment, the condensation of first material 160 on inner surface 130 is at least as fast as the evaporation of first material 160 in the region contacting the breached core material, and this evaporation is fast enough to cool the breached core material. In some aspects, heat transfer associated with condensation of first material 160 on inner surface 130 is at least as fast as a rate of heat generation from nuclear and/or chemical reactions involving the breached core material. In some implementations, first material 160 is characterized by a vapor phase having a condensation rate on inner surface 130 sufficiently fast that the vapor pressure of first material 160 within containment envelope 120 does not exceed the pressure limit of containment envelope 120. In a preferred embodiment, first material 160 may be chosen such that the evaporation kinetics (including heat transfer, boundary layer properties, turbulence, contact area and other factors) associated with the ex-vessel core material substantially "match" the condensation kinetics (including adsorption, heat transfer, surface area and the like) on inner surface 130. The condensation of first material 160 on inner surface 130 may be increased by increasing the area of inner surface 130, which may include the use of high surface area apparatus such as (but not limited to) fins 170, wires, pipes, mesh and the like.

In some embodiments, it may be advantageous to choose a first material 160 having a boiling point near an average of the first and second temperatures, near an average of the logarithm of the absolute first and second temperatures, or near approximately 30% or 60% of either of these averages. In an exemplary embodiment, a first temperature is between 700 and 2700 degrees Celsius, a second temperature is between 15 and 100 degrees Celsius, first material 160 has a melting point between 50 and 800 degrees Celsius, and first material 160 has a boiling point between 800 and 2800 degrees Celsius.

In a preferred embodiment, the boiling point of first material 160 may be substantially below (e.g., more than 400, 800, or even 1300 degrees Celsius below) the first temperature, which may increase the vaporization rate of first material 160, yet above the second temperature, which may increase heat transfer to inner surface 130. In some embodiments, the boiling point of first material 160 may be substantially greater than the second temperature (e.g., more than 100, 200, 400, or even 600 degrees Celsius greater). A boiling point of first material 160 may be above 600, 1000, 1400, or even 1800 degrees.

In some embodiments, the melting point of first material 160 may be below an expected temperature of fins 180 or even inner surface 130 during an accident (i.e., between the first and second temperatures), and first material 160 may condense as a liquid on these surfaces. In some of such cases, apparatus such as fins 180 may be configured to guide the condensed liquid first material 160 back to the breached core material and "replenish" the supply of first material 160 available for heat transfer. In select embodiments, it may be advantageous to control the temperature of the fins such that first material 160 condenses as a liquid on these surfaces, yet the temperature is still sufficiently below the boiling point of first material 160 that the driving force for condensation is large.

In some cases, it may be advantageous to choose a first material 160 having a density (of a condensed phase) that is greater than an expected density of the breached core material. In a preferred embodiment, such a dense phase of first material 160 may provide for heat transfer away from the breached core material while buoyantly floating the breached core material away from the floor of containment envelope 120. Pb may be a preferred material in such applications.

In certain embodiments, first material 160 may comprise a material having a melting point below 700 degrees Celsius. In some embodiments, first material 160 may comprise a material having a boiling point above 900 degrees Celsius. Certain embodiments may include first materials 160 comprising any of Pb, Zn, Sn, Bi, S, and Al. In certain aspects, first material 160 may be substantially comprised of Pb. First material 160 may also be comprised of oxides, particularly mixed oxides having the desired melting and boiling points, including $Na_2O$, $K_2O$. First material 160 may include amorphous materials. Eutectic compositions may be used. Cementitious materials may be used. First material 160 may be a composite material comprising a plurality of substances, which may have different melting points, boiling points, and condensation rates.

Core materials, cooling fluids, and even the ambient gas may include reactive species, and in some embodiments it may be advantageous to choose a first material 160 expected to have a minimal reactivity among a set of undesired reactions. Highly electronegative metals such as zirconium alloys may oxidize by reducing the oxides of metals having reduced electronegativities, and so choosing a non-oxide first material 160 may be advantageous in some embodiments. In other circumstances, air, oxygen, oxides, and/or water may be available for reaction, and so choosing a first material 160 that has relatively lesser tendency to oxidize, react with water, and/or reduce different oxides may be advantageous. In that the breached core material may include a plurality of species, it may be advantageous to use a fixed material 160 that is not expected to exothermically react with any component comprising more than 1% of the expected breached core material. Metals such as Pb and Zn may have a relatively modest tendency to react with various oxides, and are not sources of oxygen. Metals such as Al may form protective oxide layers that inhibit exothermic reactions. Components of first material 160 may also be chosen to provide a preferred chemical reaction with one or more species of the core material, including a reaction that modifies the viscosity of a liquid and/or a reaction that immobilizes a substance.

Various methods and apparatus disclosed herein may be incorporated with other apparatus and methods as necessary to enable the features described. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A reactor for containing a nuclear reaction, the reactor comprising:
 a sealable containment envelope having an inner surface, the containment envelope having a pressure limit of a gas contained within the containment envelope;
 a vessel including core material and located within the containment envelope, the vessel designed to enclose the core material at temperatures below a breach temperature;
 the inner surface having a containment temperature below the breach temperature; and
 an apparatus comprising a first material disposed in a location within the containment envelope such that upon a breach of the vessel by the core material, the breached core material contacts the first material; the first material having:
   a melting point below the breach temperature;
   a boiling point above the containment temperature; and
   a difference between the melting point and boiling point that is greater than 100 degrees Celsius.

2. The reactor of claim 1, wherein the first material has a boiling point above 100 degrees Celsius at a pressure of 1 atmosphere.

3. The reactor of claim 1, wherein the breach temperature is above 500 degrees Celsius and the boiling point is below the breach temperature.

4. The reactor of claim 1, wherein the first material has a melting point between 50 and 800 degrees Celsius.

5. The reactor of claim 1, wherein the first material has a boiling point at 1 atmosphere between 150 and 3000 degrees Celsius.

6. The reactor of claim 1, wherein the first material has a melting point between 200 and 700 degrees Celsius, and a boiling point between 800 and 2650 degrees Celsius.

7. The reactor of claim 1, wherein the melting point is greater than the containment temperature.

8. The reactor of claim 1, wherein the first material comprises a composition that is not expected to exothermically react with any component comprising more than 1% of the breached core material at the breach temperature and the pressure limit.

9. The reactor of claim 1, wherein the boiling point of the first material is above a third temperature between the breach and containment temperatures, and the third temperature is within 400 degrees Celsius of the containment temperature.

10. The reactor of claim 9, wherein the melting point of the first material is below the third temperature.

11. The reactor of claim 1, wherein the difference between the melting point and the boiling point is greater than 100 degrees Celsius and less than 2700 degrees Celsius.

12. The reactor of claim 1, wherein a liquid phase of the first material has a density greater than a density of at least 10% of core material.

13. The reactor of claim 1, further comprising a system to contain the breached core material and a liquid phase associated with the first material, wherein the system includes a depth sufficient to float the breached core material above a bottom surface of the containment envelope, and the first material has at least the volume necessary to float the breached core material above the bottom surface.

14. The reactor of claim 1, further comprising a system to contain the breached core material and a liquid phase associated with the first material, wherein upon contact between the breached core material and the first material, the first material forms a liquid puddle having a depth and a width, and the depth is less than 20% of the width.

15. The reactor of claim 1, wherein the first material comprises any of Pb, Zn, Sn, S, and Bi.

16. The reactor of claim 1, wherein the first material comprises Al.

17. The reactor of claim 1, further comprising an apparatus associated with the inner surface configured to increase the condensation rate.

18. The reactor of claim 1, wherein the inner surface is in fluid communication with the first material.

19. The reactor of claim 1, wherein the first material has a melting point below 700 degrees Celsius.

20. A method of transferring heat from a core material inside a containment envelope to a region outside the containment envelope, the method comprising providing a reactor having:
 a sealable containment envelope having an inner surface, the containment envelope having a pressure limit of a gas contained within the containment envelope, the containment envelope in thermal communication with the region outside the containment envelope;
 a vessel including the core material and located within the containment envelope, the vessel designed to enclose the core material at temperatures below a breach temperature;
 the inner surface having a containment temperature below the breach temperature; and
 an apparatus comprising a first material disposed in a location within the containment envelope such that upon a breach of the vessel by the core material, the breached core material contacts the first material; the first material having:
   a melting point below the breach temperature;
   a boiling point above the containment temperature; and
   a difference between the melting point and boiling point that is greater than 100 degrees Celsius at a pressure of 1 atmosphere;
 operating the reactor; and
 allowing core material at a temperature above the breach temperature to contact the first material.

* * * * *